United States Patent [19]
Fligelman

[11] Patent Number: 5,837,933
[45] Date of Patent: Nov. 17, 1998

[54] CORROSION PROOF KILL SWITCH

[76] Inventor: Kenneth H. Fligelman, 6556 NW. Highway, Chicago, Ill. 60631

[21] Appl. No.: 908,483

[22] Filed: Aug. 7, 1997

[51] Int. Cl.⁶ ................................................. H02G 3/08
[52] U.S. Cl. ...................... 174/50; 174/50.58; 174/52.1; 220/4.02
[58] Field of Search .................... 174/48, 50, 50.58, 174/52.1, 65 R, 66, 67, 51, 72 A; 220/3.8, 242, 4.02; 307/112; 200/52 R, 44; 337/187, 227, 188; 361/642, 646; D13/161, 162, 163, 152, 184

[56] References Cited

U.S. PATENT DOCUMENTS

| 2,757,817 | 8/1956 | Egan ............................................. 220/3.5 |
| 3,055,971 | 9/1962 | Lander ......................................... 174/72 A |
| 3,479,567 | 11/1969 | Glassman ..................................... 361/642 |
| 4,063,110 | 12/1977 | Glick ............................................. 307/112 |
| 4,620,061 | 10/1986 | Appleton ....................................... 174/51 |
| 4,836,802 | 6/1989 | Phillips ......................................... 439/622 |
| 4,882,647 | 11/1989 | Collins .......................................... 361/119 |
| 5,065,878 | 11/1991 | Altmann et al. .............................. 220/3.8 |
| 5,413,505 | 5/1995 | Hayes et al. .................................. 439/622 |
| 5,670,928 | 9/1997 | Cheng et al. .................................. 337/188 |
| 5,721,394 | 2/1998 | Mulks ............................................ 174/48 |

FOREIGN PATENT DOCUMENTS

| 2248734 | 4/1992 | United Kingdom ...................... 337/227 |
| 2280994 | 2/1995 | United Kingdom ...................... 174/17 CT |

*Primary Examiner*—Renee S. Luebke
*Assistant Examiner*—Dhiru R. Patel
*Attorney, Agent, or Firm*—Thomas Vigil

[57] ABSTRACT

The corrosion proof kill switch includes: a box-shaped container having an open side; a switch mounted in a sealed manner in the container and having an operating portion extending outside the container; a wire harness comprising at least two wires, extending into the container in a sealed manner; a cover for the open side of the container, the cover being fixed to the container in a sealed manner over the open side of the container; and, a fuse holder mounted in the container and having a fuse receiving portion extending out of the container.

15 Claims, 3 Drawing Sheets

CORROSION PROOF KILL SWITCH

BACKGROUND OF THE INVENTION

1. Field of the Invention.

The present invention relates to a corrosion proof kill switch for use on any motorized water craft having an ignition system. In particularly, the invention relates to a kill switch which includes a corrosion proof container in which a switch is mounted and which is adapted to be mounted in a secretive or hidden place on the boat. Preferably, wiring to the corrosion proof kill switch includes additional ground wires which, if the switch is found by a thief who attempts to jump the switch, will cause a ground short which will cause blowing of a fuse for the ignition system, thus preventing starting of the boat engine.

2. Description of the related art including information disclosed under 37 CFR §§ 1.97–1.99.

While the theft of motor craft, particularly for taking a "joy ride" is not very high, when it does occur, the boat owner often suffers series damage to his/her boat which is expensive to repair. This is because the thief typically sets the boat adrift or runs the boat aground, such as on a rocky shoreline, which causes extensive damage to the bottom of the boat, loss of the boat or loss of boat parts.

Accordingly, it is highly desirable to have an auxiliary kill switch coupled into the ignition circuit for the boat's ignition switch. Also, it is preferable that such switch be in a covered, hidden or secretive area on the boat so that it cannot easily be found, except by the owner who knows the location of the kill switch.

Further, it is desirable that the kill switch be noncorrosive since it will be exposed to moisture and oftentimes, saltwater moisture, which can be highly corrosive to electrical contacts of the switch.

Heretofore, various kill switches have been proposed and examples of some of the previously proposed switches, are disclosed in the following U.S. Patents:

| U.S. Pat. No. | Patentee |
| --- | --- |
| 3,871,199 | Perldal |
| 3,947,693 | Eskenas |
| 4,250,358 | Gilbertson |
| 4,516,000 | Ryberg et al. |
| 4,839,478 | Howard |

SUMMARY OF THE INVENTION

According to the present invention there is provided a corrosion proof kill switch comprising: a box-shaped container having an open side, a switch mounted in a sealed manner in the container and having an operating portion extending outside the container, a wire harness comprising at least two wires, extending into the container in a sealed manner, and, a cover for the open side of the container, the cover being fixed to the container in a sealed manner over the open side of the container.

DESCRIPTION OF THE PREFERRED EMBODIMENT(S)

Figure 1:
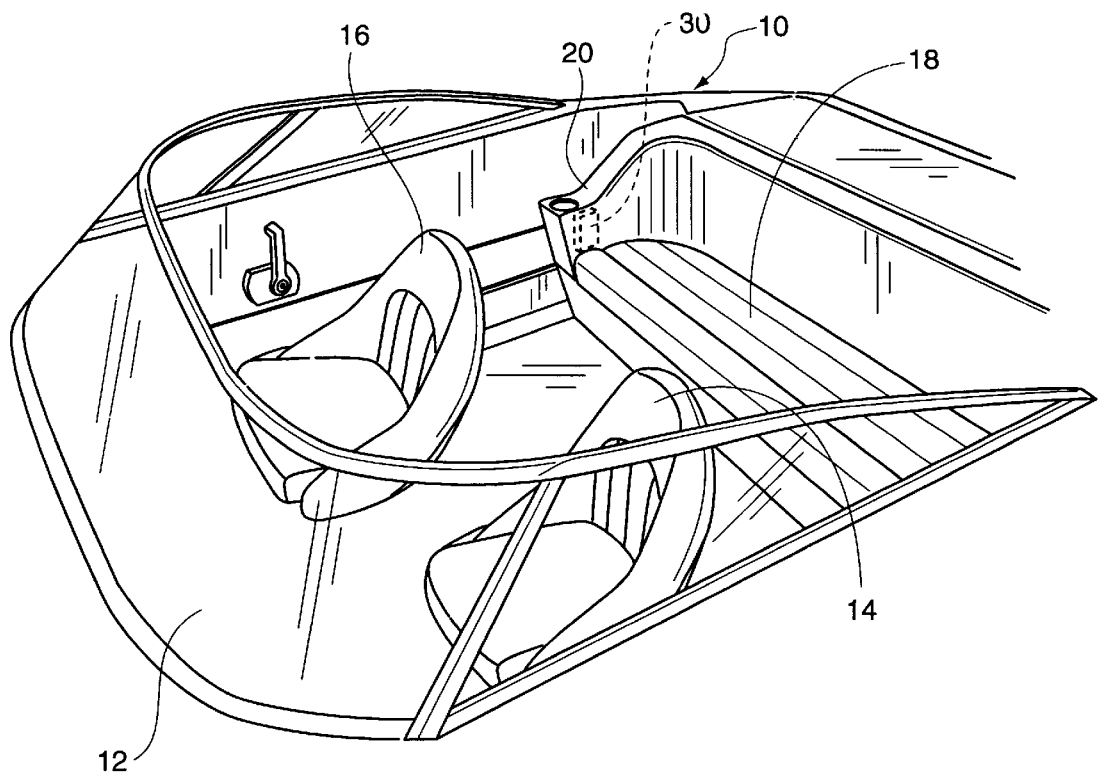
FIG. 1 is a top perspective view of the cockpit of a motorboat showing the corrosion proof kill switch of the present invention, in phantom, under an arm cushion of a back seat of the boat.

Referring now to FIG. 1, there is illustrated therein a cockpit 10 of a motorboat (not shown in complete detail) including a windshield 12, two front seats 14 and 16 and a rear seat 18 having right and left arm rests 20 on each side. Under the right arm crest 20 is located a corrosion proof kill switch 30 constructed according to the teachings of the present invention and which is shown in phantom mounted under the right arm cushion 20.

It will be understood that the corrosion proof kill switch 30 can be located anywhere on the boat and is connected by a wiring harness 32 including at least two wires 34 and 36 (FIG. 4) to the ignition system (not shown) of the motorboat located on or beneath a dashboard (not shown) typically located beneath the windshield 12 of the motorboat and near the steering system for the boat.

Figure 2:
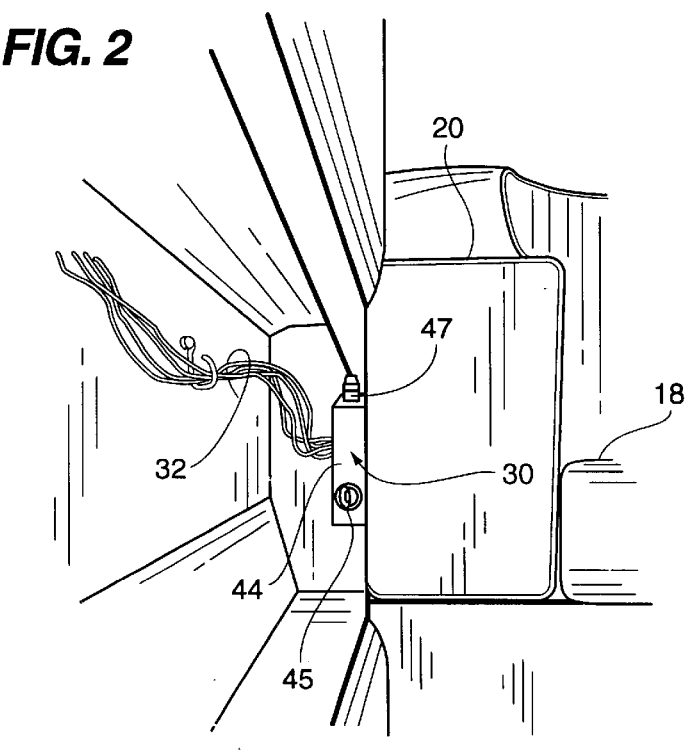
FIG. 2 is a perspective view looking at the switch from fore to aft in its position beneath the arm cushion where it is mounted.

Referring now to FIG. 2, it will be seen that in one preferred embodiment of the invention, a four wire 34, 36, 38 and 40 wiring harness 32 extends from the dashboard to the corrosion proof kill switch 30. One of these wires 34 will be a hot wire connected to a key operated switch 42 (FIG. 4) mounted in a thermoplastic corrosion proof box or container 44 of the kill switch 30. A portion 43 of the switch 42 is located outside the container and has a slot (hidden from view) for receiving a key 45. One wire 36 will be a return wire to the ignition system. This wire 36 is connected to a fuse holder 46 (FIG. 4) mounted in the box 44. The fuse holder has a fuse receiving portion 47 located outside of the container for receiving a 15 amp fuse (not shown). The other two wires 38 and 40 are ground wires connected to nothing at their free ends 48 and 50 (FIG. 4) inside the box 44.

Figure 3:
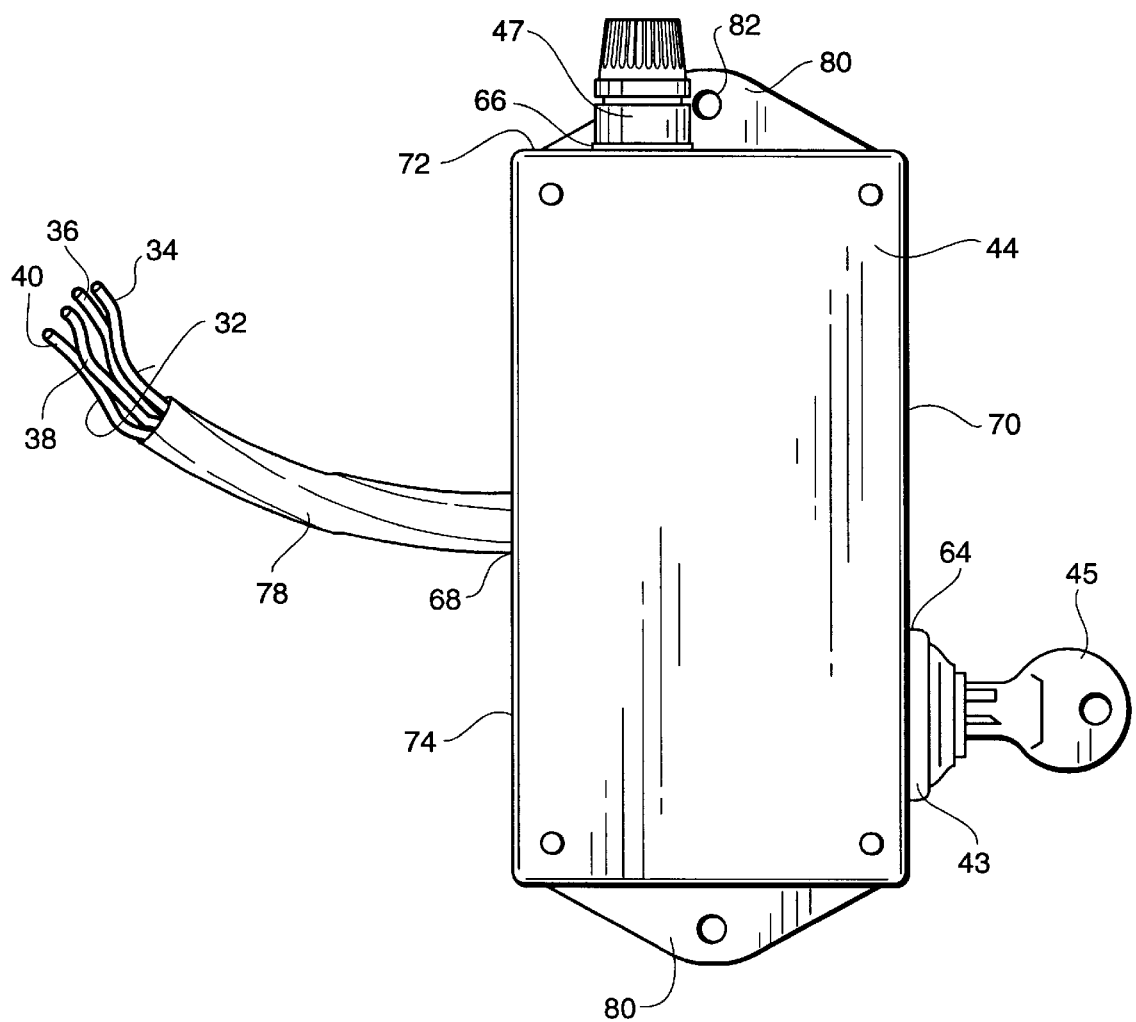
FIG. 3 is a side elevational view of the kill switch.
Figure 4:
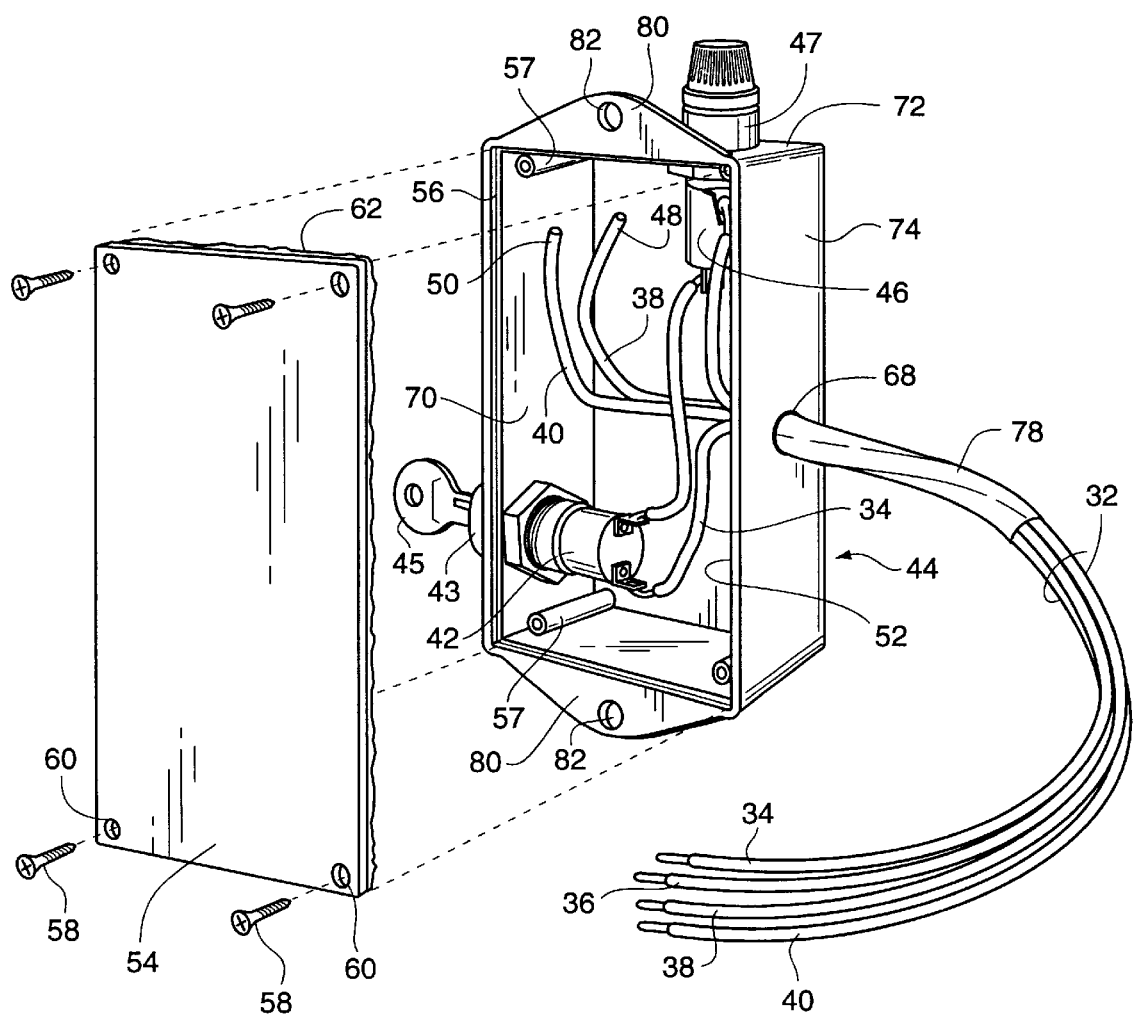
FIG. 4 is an exploded perspective view of the kill switch shown in FIG. 3 and shows box or container of the kill switch in which a key operated switch is mounted and shows the lid or cover of the box removed.

Turning now to FIGS. 2, 3 and 4, it will be understood that the corrosion proof kill switch 30 of the present invention comprises the corrosion proof, flame retardant, plastic box or container 44 which is generally rectangular in shape and which is open on one side or bottom at 52. A cover 54, also generally rectangular in shape, is secured to the open side of the box against a countersunk shoulder 56 extending around and just below the open end 52 of the box 44. Typically, four posts 57 are provided in the box 44, each for receiving a screw 58 and four holes 60 are provided in the lid or cover 54 through which the screws 58 extend. To ensure a corrosion proof sealing of the lid or cover 54 to the box, a silicone adhesive sealant 62 is provided along an inner margin of the open end 52 of the box adjacent or on the countersunk shoulder 56 extending within and around the open end 52 of the box 44 and the lid or cover 54 is pressed into the sealant 62.

Silicone adhesive sealant is also provided around the screws 58 which are screwed into the posts 56 in the box 44.

The box or container 44 is provided with three holes 64, 66 and 68 in three sidewalls 70, 72 and 74 thereof, one for receiving the key operated switch 42. The key operated switch 42 is generally cylindrical in shape and is sealed, such as with silicone adhesive sealant, within the opening 64 therefore in the box 44.

Another hole 66 is provided for receiving the fuse holder 46 which can be a LITTLE-FUSE® fuse holder which also is sealed within the hole 66 therefore and has a portion 47 extending therefrom for receiving a 15 amp fuse (not shown).

The third hole 68 is provided in a side wall 74 of the box 44 and has a sleeve 78 mounted thereon for receiving the wires 34, 36, 38 and 40 of the wiring harness 32 into the box 44. The sleeve 78 is fitted tightly around the wires and sealed around the hole 68 in the side wall 74 of the box 44 to prevent moisture from entering the box 44. If desired, the sleeve 78 can extend all the way from the kill switch 30 to the ignition system to further inhibit into the box. Still further, silicone adhesive sealant can be inserted into the sleeve 78 in the area of the hole 68 to further inhibit moisture from entering the box 44.

The three holes 64, 66 an 68 are in separate side walls 70, 72 and 74 of the box 44, but could be located on the same side wall 74, if desired. The arrangement of the three holes 64, 66 and 68 holes in the box 44 as shown in FIG. 3 is the preferred arrangement.

As shown in FIG. 4, the two wires 38 and 40, which are ground wires, merely extend into the box 44 and extend to a corner away from the key operated switch 42 or the fuse holder 46. If desired, the free end 48 or 50 of each wire 38 or 40 can be covered with tape or capped with a WIRE NUT®, (not shown).

Since the extra two wires 38 and 40 are ground wires, if a thief should be fortunate enough to find the kill switch 30, and then tries to jump the hot wire 34 from the ignition system to the wire 36 leading back to the ignition system, he has to guess which wires 34, 36, 38 or 40 to jump and, if he connects the wrong wires together, he will cause a ground short causing blowing of the fuse for the ignition system, thereby preventing starting of the boating system.

Also if desired, and as shown, the box or container has upper and lower mounting tabs or ears 80 each with a mounting hole 82 for receiving a screw to facilitate mounting of the box or container to a panel in the boat.

From the foregoing description, it will be apparent that the corrosion proof kill switch 30 of the present invention has a number of advantages, some of which have been described above and others of which are inherent in the invention. Also it will be understood that modifications can be made to the corrosion proof kill switch 30 described above without departing from the teachings of the present invention. Accordingly, the scope of the invention is only to be limited as necessitated by the accompanying claims.

I claim:

1. A corrosion proof kill switch comprising:
   a box-shaped container having an open side;
   a switch mounted in a sealed manner in the container and having an operating portion extending outside the container;
   a wire harness comprising at least two wires, extending into the container in a sealed manner;
   a cover for the open side of the container, the cover being fixed to the container in said sealed manner over the open side of the container; and,
   a fuse holder mounted in said container and having a fuse receiving portion extending out of said container.

2. The corrosion proof kill switch of claim 1 wherein said cover is sealed around said open side in said container by a silicone adhesive sealant.

3. The corrosion proof kill switch of claim 1 wherein said container and said cover are made of a flame retardant, thermoplastic material.

4. The corrosion proof kill switch of claim 1 wherein said switch is a key operated switch having a portion located outside of said container with a slot therein for receiving a key.

5. The corrosion proof kill switch of claim 1 wherein one of said at least two wires is connected to a terminal of said switch inside said container and the other of said at least two wires is connected to a terminal of said fuse holder and a jumper wire is provided in said container, connected between another terminal of said fuse holder and another terminal of said switch.

6. The corrosion proof kill switch of claim 1 including at least one additional wire extending into said container and having a free non-connected end in said container.

7. The corrosion proof kill switch of claim 6 wherein said at least one wire is connected or not connected at its end outside said container.

8. The corrosion proof kill switch of claim 1 including at least two additional wires in said wire harness, each having a free unconnected end in said container and at least one of said additional wires being connected or not connected outside said container.

9. The corrosion proof kill switch of claim 8 wherein both of said additional wires are connected at an end thereof outside said container to the system ground.

10. The corrosion proof kill switch of claim 1 wherein said wiring harness includes a sleeve (FIG. 3) which extends out of said container and which is sealed to said container.

11. The corrosion proof kill switch of claim 10 wherein said wires in said sleeve, at least in the area where they enter said container, are coated with an adhesive sealant to prevent moisture from entering into said container.

12. The corrosion proof kill switch of claim 10 being adapted to be connected to an ignition system for a boat or vehicle and wherein said wiring harness extends from said container to the ignition system for the boat or vehicle in which the kill switch is mounted.

13. The corrosion proof kill switch of claim 1 wherein said container, at said open side, has an inner countersunk shoulder extending around said open side and forming a seat for said lid or cover.

14. The corrosion proof kill switch of claim 13 wherein said cover is sealed around said open side in said container by a silicone adhesive sealant applied on said shoulder completely around said open side of said container.

15. The corrosion proof kill switch of claim 1 wherein said container has upper and lower mounting tabs each with a mounting hole therein for receiving a screw to facilitate mounting of said container to a panel in the boat.

* * * * *